ns Patent [19]

Dabby et al.

[11] 4,341,541
[45] Jul. 27, 1982

[54] PROCESS FOR THE PRODUCTION OF OPTICAL FIBER

[75] Inventors: Franklin W. Dabby, Woodbridge; Ronald B. Chesler, Cheshire, both of Conn.

[73] Assignee: Times Fiber Communications, Inc., Wallingford, Conn.

[21] Appl. No.: 57,458

[22] Filed: Jul. 13, 1979

[51] Int. Cl.³ ............................................. C03B 19/06
[52] U.S. Cl. ..................................... 65/3.12; 65/18.2; 65/32
[58] Field of Search .................... 65/3 A, 18, 32, 3.12, 65/18.2; 427/163

[56] References Cited

U.S. PATENT DOCUMENTS 3,826,560  7/1974  Schultz ............................. 65/3 A X
3,932,160  1/1976  Camlibel et al. ..................... 65/3 A
4,157,906  6/1979  Bailey ................................. 65/3 A
4,191,545  3/1980  MacChesney et al. ............... 65/3 A
4,230,472 10/1980  Schultz .............................. 65/3 A

OTHER PUBLICATIONS

French, MacChesney and Pearson, "Glass Fibers for Optical Communications", Annual Review of Materials Science, 1975, pp. 373-394.

*Primary Examiner*—Richard V. Fisher
*Attorney, Agent, or Firm*—Bacon & Thomas

[57] ABSTRACT

A process for preparing a preform for the production of optical fiber by depositing and sintering glass particles upon a glass rod is disclosed. The process comprises directing a stream of glass particles onto the surface of a glass rod which is slowly rotated and moved in a translational direction so as to obtain even deposition of the particulate matter. A separate heat source is supplied beyond the point of deposition of the particles and continuously sinters the deposited particulate as the rod undergoes repeated translation.

7 Claims, No Drawings

PROCESS FOR THE PRODUCTION OF OPTICAL FIBER

BACKGROUND OF THE INVENTION

1. Field of the Invention:

The present invention is directed to an improved method for the manufacture of optical fiber.

2. Description of the Prior Art:

During the past decade, a great deal of work has been undertaken directed to the manufacture of glass transmission lines for visible and near-visible electromagnetic radiation, commonly referred to as optical waveguides or optical fiber. In brief, optical waveguides are extremely thin, flexible glass fibers, prepared by drawing glass preforms under controlled conditions. Although these conditions are subject to wide variation, depending upon such factors as the composition of the glass and the drawing procedure, the optical waveguide so prepared will comprise, in its simplest form a glass core of a given constant diameter, surrounded by a glass cladding having an index of refraction less than that of the glass core. The cladding acts as a barrier which confines the light to the core.

While the drawing procedure is important in obtaining a properly functioning optical waveguide, it is the production of the glass preform which is drawn into the fiber which controls the ultimate composition and hence transmission properties of the waveguide. Thus far, workers in the art have proposed to manufacture such preform in several ways. One method, described in U.S. Pat. No. 3,932,160, forms a glass preform by deposition of borosilicate particulate on a pure silica start rod by high temperature pyrolysis of a gaseous mixture of silane and borane or a gaseous mixture of silicon tetrachloride and boron trichloride. The temperature required to effect the pyrolysis reaction can be produced by conducting the deposition in a reaction furnace which heats both the gaseous mixture of reactants and the rod. Alternately, the requisite temperatures can be obtained by directing the reactants through a natural gas flame in the presence of oxygen. The pyrolysis reaction produces fine particles of borosilicate glass which are deposited on the pure fused silica start rod. After the deposition is completed, the composite is introduced into a furnace where it is heated to sinter the deposited particulate, thereby forming the outer region of the core and the cladding of the preform.

To produce a preform having a graded profile, that is, a radially varying index of refraction, the ratio of the silicon containing reactant to the boron containing reactant in the gaseous mixture is varied in such a manner that borosilicate particulate having increasing proportions of boron oxide relative to silica is produced. Moreover, to insure that the deposition of borosilicate is uniform for a given radial distance from the preform axis, the start rod must be simultaneously translated and rotated to provide even distribution of the particulate over the length of the rod. Thus, by setting a uniform translation and rotation rate for the start rod, the concentration of components in the gaseous reactant mixture can be continously varied so as to achieve the desired radial concentration profile of borosilicate which is uniform for a given radial distance from the center of the rod.

Because the nature of optical fiber is such that slight discrepancies in the radial compositional profile may cause significant deleterious results in transmission capability, it is always desirable to employ a method for producing waveguides which insures that a precisely uniform composition profile is obtained.

SUMMARY OF THE INVENTION

Accordingly, it is an object of the present invention to provide a method for preparing a preform which can be drawn into optical fiber, which provides improved control over the radial composition profile of the particulate glass cladding deposited on the glass start rod.

Another object of the invention is to provide an improved optical waveguide which exhibits a precisely uniform radial compositional profile and hence, a corresponding uniform, radially decreasing index of refraction.

Still other objects and advantages of the present invention will become apparent to those of skill in the art upon review of the entire disclosure contained herein.

The foregoing objects and advantages are accomplished by providing a process for the production of optical fiber which comprises preparing a preform by depositing and sintering glass particles on a cylindrical glass rod, heating the preform so prepared to the drawing temperature and drawing it into optical fiber in which the sintering operation is performed continuously so that each layer of glass particulate is deposited upon completely sintered glass. The process is particularly adapted for preparing borosilicate clad optical fiber.

DETAILED DESCRIPTION OF THE INVENTION

In conventional methods for preparing glass preforms by depositing and sintering glass particles on a glass start rod, deposition and sintering are conducted as two separate and successive operations. A composite comprising the start rod and the paticulate deposit is prepared and introduced into a furnace where it is heated to the appropriate temperature to effect sintering of the entire structure.

A significant drawback to this method is that it allows for diffusion to occur between the deposited glass particulate prior to sintering. Since the particular refractive index profile of the deposited particulate is directly dependent upon its composition, it is essential to the obtainment of a preform having a precise radially varying index of refraction that the composition of the deposited particulate be precisely controlled. Diffusion inhibits this objective by causing mixing of the deposited particulate, thereby clouding the precision of its compositional profile.

To the contrary, when continuous sintering of the particulate is performed, diffusion is prevented since each layer of particulate is deposited on a layer of sintered glass. Hence, the composition of the deposited glass layers may be precisely controlled by controlling the composition of the particulate stream. This is accomplished by providing at least one independent source of heat, which continuously sinters the glass particulate after it is deposited. This independent heat source is preferably positioned just beyond the point of deposition of the particulate on the rod. Typically, a cylindrical furnace surrounding the glass rod serves as this heat source. According to a preferred embodiment of the invention, an independent heat source is positioned on each side of the point of deposition of the particulate on the rod. In this manner, the particulate is continuously deposited on a sintered layer of the particulate which was deposited and sintered on the previous pass through the particulate stream and heat source. This continuous sintering enhances the uniformity and precision of the composition of the preform.

As previously mentioned, the process of the present invention is particularly adapted for use in the production of borosilicate clad optical fiber. In such production schemes, the borosilicate particulate is prepared by high temperature pyrolysis of gaseous mixtures of a silicon containing compound such as $SiH_4$, $SiCl_4$ and $SiBr_4$ and a boron containing compound such as $B_2H_6$, $BCl_3$ and $BBr_3$, preferably silicon tetrachloride and boron trichloride. The pyrolysis reaction can be conducted in a reaction furnace or, preferably, in a natural gas flame in the presence of oxygen. The reactant gas mixtures are directed through the flame or furnace in the direction of the glass rod and react to form the borosilicate particulate which deposits on the glass rod. The rod is continuously rotated and translated to produce a uniform deposit along its length. By adjusting the flow of either reactant gas mixture to the reaction area, the composition of the borosilicate particulate is varied. Generally, it is desirable to maintain the flow of silicon tetrachloride constant and adjust solely the flow of boron trichloride to the pyrolysis reaction. The flow of boron trichloride is adjusted so as to achieve a borosilicate particulate which, when deposited exhibits an increasing compositional profile of boron oxide relative to silica. This insures that, upon sintering, an outer region surrounding the pure silica start rod is obtained having a radially varying index of refraction.

It is generally preferred to conduct the sintering operation under an atmosphere of helium to prevent the formation of bubbles in the deposited particulate. The sintering temperature, which may be varied in response to the particular composition of the deposited particulate, ranges from about 500° to 1500° C. and preferably from about 900° to 1300° C., when borosilicate particles are deposited. Moreover, as the concentration of boron in the particulate increases, the initial sintering temperature may be gradually reduced, within these ranges.

Drawing of the glass preform is accomplished in a separate drawing furnace where the preform is heated to the drawing temperature and drawn into fiber. Such drawing procedures are well known to those of skill in the art.

The apparatus for carrying out the method of the invention comprises, in combination, means for holding a cylindrical glass start rod and imparting translational and rotational pyrolysis of silicon and boron containing gaseous mixtures and directing the particulate product towards the glass start rod, and means for continuously sintering the deposited particulate.

While the present invention has now been described in terms of certain preferred embodiments, the skilled artisan will readily appreciate that various modifications, changes, omissions and substitutions may be made without departing from the spirit thereof. It is intended, therefore, that the present invention be limited solely by the scope of the following claims.

What is claimed is:

1. A process for the production of optical fiber comprising continuously depositing and continuously sintering glass particles produced by high temperature pyrolysis of gaseous reactants on a cylindrical glass rod to produce an outer region of sintered glass surrounding said rod having an index of refraction lower than that of said rod, heating the resulting preform to the drawing temperature and drawing said preform into optical fiber, wherein said continuous sintering is effected by a heat source disposed beyond the point of the particulate deposition on the cylindrical glass rod.

2. The process as defined by claim 1, wherein said glass particles are borosilicate particles produced by high temperature pyrolysis of a first gaseous reactant selected from the group consisting of $SiH_4$, $SiCl_4$ and $SiBr_4$ and a second gaseous reactant selected from the group consisting of $B_2H_6$, $BCl_3$ and $BBr_3$ and said cylindrical glass rod is pure fused silica.

3. The process as defined by claim 2, wherein said gaseous reactants are $SiCl_4$ and $BCl_3$.

4. The process as defined by claim 3, wherein said high temperature pyrolysis is conducted as a flame pyrolysis by burning natural gas in the presence of oxygen.

5. The process as defined by claim 1, wherein said heat source comprises a cylindrical shaped furnace which surrounds said cylindrical glass rod.

6. The process as defined by claim 5, wherein the temperature in said furnace is between about 500° and 1500° C.

7. The process as defined by claim 5, wherein said furnace contains an atmosphere of helium.

* * * * *